Patented July 23, 1929.

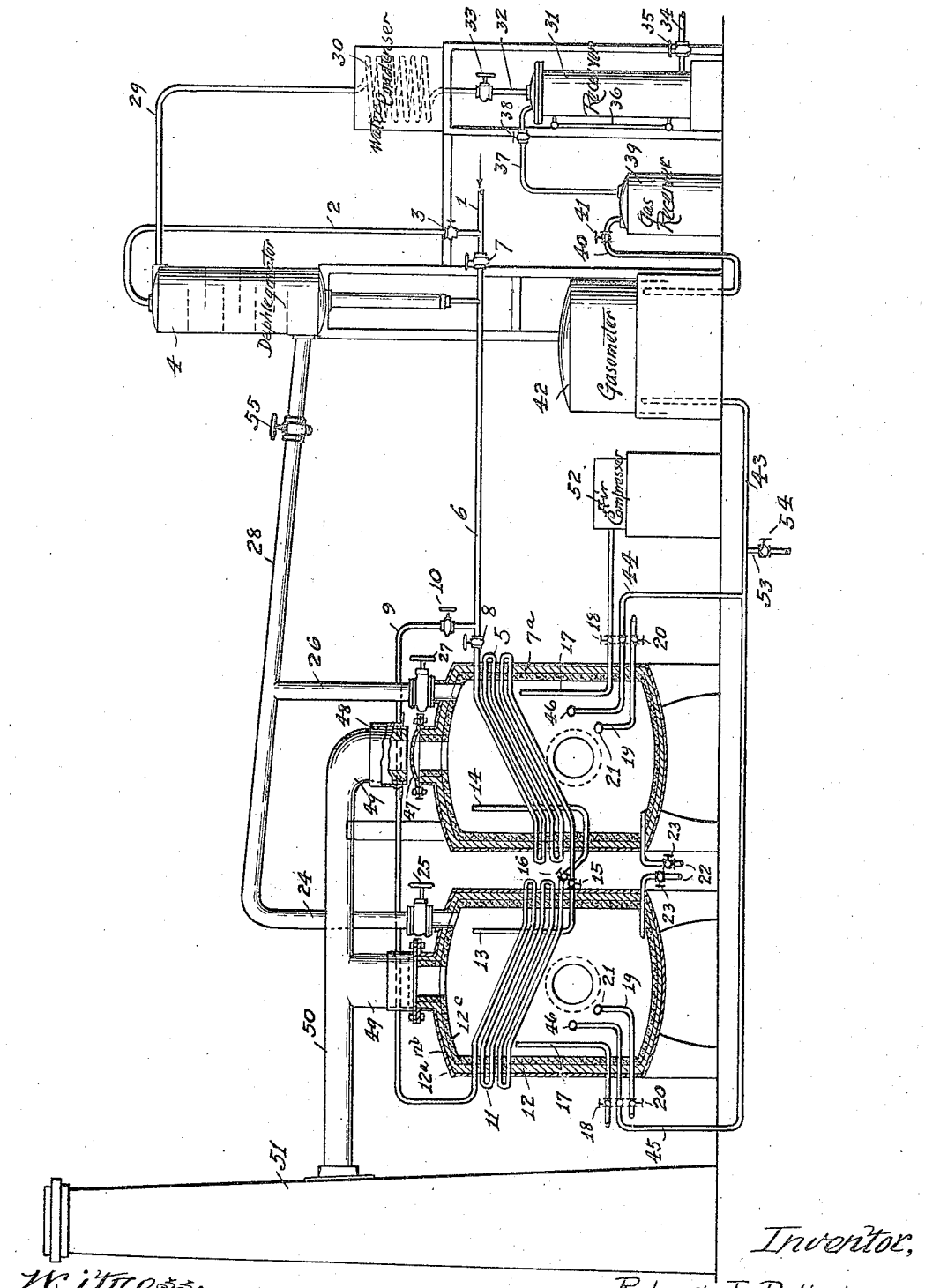

1,721,973

UNITED STATES PATENT OFFICE.

ROBERT T. POLLOCK, OF BOSTON, MASSACHUSETTS, ASSIGNOR TO UNIVERSAL OIL PRODUCTS COMPANY, OF CHICAGO, ILLINOIS, A CORPORATION OF SOUTH DAKOTA.

PROCESS AND APPARATUS FOR TREATING OILS.

Application filed March 23, 1921, Serial No. 454,962. Renewed May 29, 1928.

This invention relates to a process and apparatus for treating oils and refers more particularly to a process in which the carbon, which is deposited from the oil body during treatment, is effectively used as a combustible fuel in operating the process, removing at the same time its chief objectionable quality, its collection in the expansion chambers.

Among the salient objects of the invention is to provide a process in which the oil may be continuously treated by positively controlled heating means and the carbon, which is deposited during the oil treatment, is permitted to collect in the expansion chambers from which it is subsequently eliminated by using the carbon as a combustible fuel in further treating the oil; to provide a process in which the oil is treated in heating chambers, the chambers being used alternately as expansion chambers and heating chambers whereby difficulties previously caused by carbon collection are effectively obviated; to provide a process which has an increased efficiency due to the fact that a portion of the gaseous vapors generated are returned to be consumed as fuel gases and one in which the carbon deposition as well as the residuum drawn off from the expansion chambers may also be used for supplying heat to the heating chambers for treating the oil; to provide an apparatus for carrying out this process and, in general to provide the process and apparatus hereinafter described.

The single figure is a side elevation partly in section of the apparatus.

The raw oil is introduced from any convenient source through the charging line 1 and may be either introduced through the vertical line 2 controlled by a valve 3 to the top of the dephlegmator 4 or may be introduced directly to the heating coils 5 through the line 6 controlled by a valve 7. The oil, being charged through the inlet line 6, may be directed into the heating coils 5 mounted in the chamber 7ª through a line in which the valve 8 is interposed or the valve 8 may be closed and the oil directed through a line 9 controlled by a valve 10, the latter being the case when the oil is to be directed to the heating coils 11 mounted in the chamber 12. The chambers 7ª and 12 are identical in construction, each having a set of heating coils 5 and 11 mounted therein, terminating in vertical standpipes 13 and 14 respectively controlled by valves 15 and 16. Each chamber has a water line 17 controlled by a valve 18 and a fuel oil line 19 controlled by a valve 20 on which is fitted an oil burner 21. These fuel oil lines may be connected to a source of supply such as a supply tank (not shown) which receives its oil from the residuum draw-off lines 22 controlled by valves 23 which are inserted in the bottom of the chambers for withdrawing the heavy residual oil therefrom. The chamber 12 has a vapor line 24 regulated by a valve 25 which is connected to a vapor riser 26 controlled by a valve 27 adapted to direct the generated vapors in the expansion chamber 7ª to a common vapor line 28 thence to the dephlegmator 4 where the vapors are subjected to the refluxing action of the raw oil flowing in the opposite direction and after thus being refluxed the still uncondensed portions of the vapors are directed through the line 29 through the water condenser 30 to the receiver 31. The line 32 controlled by a valve 33 connects the condenser with the receiver. The receiver has a liquid draw-off 34 regulated by a valve 35 and a liquid level gauge 36. A gas relief pipe 37 regulated by a valve 38 passes the incondensable gas to a gas receiver 39 from which it is directed through a line 40 controlled by a valve 41 to a gasometer 42. A lead 43 supplies the incondensable gas to the lines 44 and 45, the latter two gas lines furnishing a means of supplying the chambers 7ª and 12 respectively with combustible gaseous fuel. Suitable burners 46 are mounted on the ends of these gas lines within the chamber. When the chambers are being used as expansion chambers the open necks are covered by means of pressure tight covers 47 which are bolted firmly in place as shown in the drawing on the chamber 7.

When this cover is in place the sleeves 48, which fit upon the flue pipes 49, are raised as shown above the same chamber. When one of the chambers is being used as a heating or combustion chamber the pressure tight cover plate 47 is removed and the sleeve lowered and fastened to the engaging flange of the open throat portion of the chamber as shown in the drawing in connection with the chamber 12. The separate flues 49 are combined to form a common flue 50 which leads to the stack 51 through which the combustion gases are released to the atmosphere.

Compressed air is supplied to the separate chamber through the pipe 17 from the air compressor 52.

Describing now more in detail the operation of the process—the oil, after being introduced through the inlet pipe to the top of the dephlegmator or directly to the pipe 6, the valve 8 being closed and the valve 10 open, passes through the line 9 and to the heating coils 11 mounted in the chamber 12.

In the initial stages of the process this chamber will be heated by means of the gas burners, which may receive their supply of gas through a line 53 controlled by a valve 54 from any extraneous source or after the process has been in operation from the receiver and gasometer as described. An alternate means of heating is supplied by the fuel oil lines 19. In either event the expansion chamber 12, which consists of an outer still shell, as shown at $12^a$, and an inner lining of refractory material shown in two layers $12^b$ and $12^c$, may be used. Such materials as Hytempite or #31 Johns-Manville retort lining are suitable. Also, an inner lining of fire brick used at $12^c$ and a layer of Sil-O-Cel insulation brick would furnish an adaptable chamber lining.

The oil coursing through the heating tubes is subjected to a cracking temperature and passes into the chamber $7^a$ through the stand pipe 14. This chamber $7^a$ is used as an expansion chamber, the pressure plate 47 being bolted in place. In this chamber the conversion of the oil takes place, the vapors passing out through the vapor lines 26 and 28 to the dephlegmator and thence through the condenser and receiver where they are collected in liquid form. It is understood, of course, that the valve 25 is closed, combustion gases from the chamber 12 passing off into the stack. If desired, the residuum may be drawn off but the greater part of the carbon, which is released in the conversion of the oil, is retained and permited to collect in the expansion chamber $7^a$. When this carbon collection has reached the amount desired the valve 10 is closed and the valve 8 opened. A pressure-tight flanged plate similar to that shown at 47 is then bolted on the top of the combustion chamber 12 and the valve 55 closed and valve 25 opened. This will immediately bring the pressure in the chamber 12 to approximate that maintained on the rest of the system at which time the valve 55 is again opened. The valve 27 is now closed and the cover plate 47 on chamber $7^a$ removed. The slidable sleeve 48 is lowered, which connects the outlet flue 49 with the top of the chamber $7^a$ which now becomes the combustion chamber.

As the carbon has been permitted to collect in the chamber $7^a$ and remains there in a substantial body and at a high temperature, it is only necessary to introduce air through the line 17 to immediately bring the carbon to a temperature which will effectively heat the oil to a cracking temperature which is now being circulated through the heating coils 5.

As explained the direction of the oil is now reversed, it being heated in the chamber $7^a$ and after passing through the heated coil 5 and stand pipe 13 is introduced to the chamber 12 which now becomes the expansion chamber. The operation with the latter chamber as an expansion chamber is identical to that previously explained in the case of the chamber $7^a$. If desired, residuum may be drawn off from time to time from either of the chambers when used as an expansion chamber. The carbon is now permitted to collect in the chamber 12 as it was formerly in the chamber $7^a$ and simultaneously with this collection the carbon in the chamber $7^a$ is being burned out by the introduction of air from the compressor 52. If the amount of carbon is insufficient to heat the amount of oil which will produce a desired carbon collection in the chamber 12, additional heat may be supplied through the gas line 44 or fuel oil line 19 in the chamber $7^a$. Subsequent to the formation of a desired amount of carbon in the chamber 12, the process is again reversed to its initial operation and thus the process may be continued indefinitely. It is obvious that any number of these chambers may be used instead of the double apparatus shown in the drawings. Also, the invention is not limited to the details of construction as it is possible to mount the heating tubes outside of the chambers and direct the gases from both of the chambers over heating coils so positioned.

By alternately coursing the oil in the separate combustion chambers in the manner described carbon difficulties are effectively eliminated and the oil may be continuously treated at a regulated temperature and the character of the distillate positively controlled. At the same time the efficient use of residuum fuel oil drawn off from the chambers to be subsequently used as fuel and the employment of the incondensable gas as fuel are substantial items in the operation of the process.

By regulating the amount of air used in burning the carbon the temperature in the chamber used as a combustion chamber may be positively regulated.

I claim as my invention:—

1. In an apparatus for cracking oil, the combination with a pair of adjacent insulated chambers, of a heating coil in each chamber, the coils in each chamber discharging into the open interior of the adjacent chamber, means for alternately passing oil through said coils and delivering the heated oil alternately to said chambers for vaporization, means for discharging the vapors from said chambers, and means for heating the oil passing through said coils by igniting carbon accumulating in the enlarged chambers during the alternate use of said chambers as vapor chambers.

2. The process for cracking oil, comprising passing a stream of oil through an enlarged chamber and discharging said oil into a second chamber, in alternately passing a stream of oil through said second chamber, and discharging the same into the first mentioned chamber, the process including heating the oil when passing through the first chamber by consuming carbon formed therein during conversion of a body of oil, and in discharging the heated oil into said second chamber where conversion occurs, and in thereafter consuming the carbon formed from the conversion in the second chamber to heat the stream therein and discharging the heated oil into the first chamber.

3. An apparatus for cracking oil, comprising adjacent enlarged chambers, of means for conducting a stream of oil through each of said chambers, said oil conducting means in each chamber discharging into its adjacent chamber, means for selectively passing oil through the stream in either of said chambers and for delivering the oil alternately to the adjacent chambers for conversion, means for discharging converted products from either of the chambers, and means for heating the oil while passing through the stream in either chamber by igniting carbon accumulating in the enlarged chambers during the alternate use of said chambers as conversion chambers.

4. A process for cracking hydrocarbon oil, consisting in permitting a quantity of precipitated carbon to accumulate in an enlarged zone, capable of use as a combustion chamber, in flowing a stream of oil through a conduit disposed within said zone wherein it is subjected to a cracking heat, in causing regulated combustion of accumulated carbon in said zone to heat the oil in said stream, in delivering the heated oil from said stream to a second enlarged zone, wherein the carbon contained in the oil precipitates, in continuing the operation until the carbon has accumulated to the desired extent in said second enlarged zone, in thereafter flowing the oil stream through a second conduit disposed within said second enlarged zone, wherein it is heated by regulated combustion of the carbon accumulated in said second zone, and, during the heating of the oil in said second zone, delivering the heated oil to said first zone.

5. A process for cracking hydrocarbon oil comprising permitting carbon formed by cracking oil to accumulate in an enlarged zone capable of use as a combustion chamber, flowing a stream of oil through a conduit, wherein it is subjected to a cracking heat, causing regulated combustion of accumulated carbon in said zone to heat the oil in said conduit, delivering the heated oil from said conduit to a second enlarged zone, wherein the carbon contained in the oil precipitates, continuing the operation until the carbon has accumulated to a substantial extent in said second enlarged zone, thereafter directing an oil stream through a second conduit and heating the oil stream in said second conduit by regulated combustion of the carbon accumulated in said second zone and during the heating of the oil in said second conduit delivering the heated oil to said first zone.

ROBERT T. POLLOCK.